United States Patent
Hicks et al.

(10) Patent No.: US 7,129,409 B1
(45) Date of Patent: Oct. 31, 2006

(54) ELECTRONICS CABINET

(76) Inventors: Lester Brian Hicks, 3020 Hopeland Dr., Powder Springs, GA (US) 30127; Hugh J. Moore, 3115 Macedonia Dr., Powder Springs, GA (US) 30127

( * ) Notice: Subject to any disclaimer, the term of this patent is extended or adjusted under 35 U.S.C. 154(b) by 0 days.

(21) Appl. No.: 10/841,323

(22) Filed: May 7, 2004

(51) Int. Cl.
*G02B 6/00* (2006.01)

(52) U.S. Cl. .................. 174/50; 174/17 R; 174/58; 220/4.31; 312/265.1

(58) Field of Classification Search ............ 174/50, 174/17 R, 58, 60; 361/695, 601, 602; 312/265.6, 312/265.1–265.3; 220/4.31
See application file for complete search history.

(56) References Cited

U.S. PATENT DOCUMENTS

| | | | |
|---|---|---|---|
| 4,371,138 A | 2/1983 | Roberts | |
| 4,437,714 A * | 3/1984 | Struck | 312/281 |
| 5,094,020 A * | 3/1992 | Wingfield et al. | 38/1 A |
| 5,397,160 A | 3/1995 | Landry | |
| D379,616 S | 6/1997 | Hellhake et al. | |
| 5,725,189 A | 3/1998 | Landy | |
| 5,806,946 A * | 9/1998 | Benner et al. | 312/265.3 |
| 5,823,599 A | 10/1998 | Gray | |
| 6,338,429 B1 | 1/2002 | Pesce | |
| 6,791,027 B1 * | 9/2004 | Nicolai et al. | 174/50 |

* cited by examiner

*Primary Examiner*—Dhiru R. Patel

(57) ABSTRACT

Electronics cabinets stabilize electronic devices in vehicles. The electronics cabinet removably attaches to the vehicle seat frames via seat attachment holes in the bottom end of the legs. A pair of front stabilizers fitted onto the front of the bottom end of the legs and a rear stabilizer supporting the rear of the bottom end of the legs further contribute to the stability of the electronics cabinet. A top shelf and a middle shelf are provided to support electronic devices and other items. The back of the electronics cabinet has a wire exit hole to facilitate connecting devices within the cabinet to the vehicle and/or devices on top of the cabinet. A door of the roll-up type may be present to secure items within the interior of the cabinet. A retainer and front restraint may be present to secure items to the top of the cabinet.

10 Claims, 2 Drawing Sheets

ELECTRONICS CABINET

BACKGROUND OF THE INVENTION

1. Field of the Invention

The present invention relates to an electronics cabinet for use in connection with vehicles. The electronics cabinet has particular utility in connection with stabilizing electronic devices in vehicles.

2. Description of the Prior Art

Electronics cabinets are desirable for stabilizing electronic devices in vehicles. On long trips, particularly with children, it is desirable to have a form of entertainment available. While vehicles are increasingly being built with video display systems, such systems are expensive and are limited to use within the vehicle. Furthermore, such video display systems are rarely customizable. Electronics cabinets provide a convenient and secure means for mounting a television, VCR, DVD player, and/or video gaming system within a vehicle to entertain the passengers. By using an electronics cabinet, the user determines exactly what types of electronic equipment will be available. Also, because the electronic equipment is not permanently mounted in the vehicle, it can be removed for use in other environments.

The use of television holding devices is known in the prior art. For example, U.S. Pat. No. 6,338,429 to Pesce discloses a television holding device. However, the Pesce '429 patent does not have a door, and has further drawbacks of lacking rectangular front stabilizers.

U.S. Pat. No. 5,725,189 to Landy discloses a media mounting device for motor vehicles that includes a wedge shaped stand portion of light-weight material to support an electronic device. However, the Landy '189 patent does not have a door, and additionally does not have rectangular front stabilizers.

Similarly, U.S. Pat. No. 4,371,138 to Roberts discloses a device for mounting equipment in vehicles that utilizes the transmission housing hump in the front portion of rear wheel drive vehicles as a base. However, the Roberts '138 patent does not have a door, and also lacks rectangular front stabilizers.

In addition, U.S. Pat. No. 5,823,599 to Gray discloses a mechanized floor console that includes a module receptacle and a plurality of interchangeable storage and appliance modules designed to fit within the module receptacle. However, the Gray '599 patent does not have a door, and also does not have rectangular front stabilizers.

Furthermore, U.S. Pat. No. Des. 379,616 to Hellhake et al. discloses a vehicle cabinet that has two doors. However, the Hellhake et al. '616 patent does not have a roll-up door, and further lacks rectangular front stabilizers.

www.JCWhitney.com discloses a TV Tote™ portable TV/VCR carrying case that has a fold-out shelf. However, the www.JCWhitney.com invention does not have a roll-up door, and also does not have rectangular front stabilizers.

Lastly, U.S. Pat. No. 5,397,160 to Landry discloses a vehicle console that has a housing including an upper compartment with mounting portions for mounting a video unit in an inclined orientation. However, the Landry '160 patent does not have a roll-up door, and has the additional deficiency of lacking rectangular front stabilizers.

While the above-described devices fulfill their respective, particular objectives and requirements, the aforementioned patents do not describe an electronics cabinet that allows stabilizing electronic devices in vehicles. The above patents make no provision for rectangular front stabilizers or a roll-up door.

Therefore, a need exists for a new and improved electronics cabinet that can be used for stabilizing electronic devices in vehicles. In this regard, the present invention substantially fulfills this need. In this respect, the electronics cabinet according to the present invention substantially departs from the conventional concepts and designs of the prior art, and in doing so provides an apparatus primarily developed for the purpose of stabilizing electronic devices in vehicles.

SUMMARY OF THE INVENTION

In view of the foregoing disadvantages inherent in the known types of television holding devices now present in the prior art, the present invention provides an improved electronics cabinet, and overcomes the above-mentioned disadvantages and drawbacks of the prior art. As such, the general purpose of the present invention, which will be described subsequently in greater detail, is to provide a new and improved electronics cabinet which has all the advantages of the prior art mentioned heretofore and many novel features that result in an electronics cabinet which is not anticipated, rendered obvious, suggested, or even implied by the prior art, either alone or in any combination thereof.

To attain this, the present invention essentially comprises a cabinet having a top, a bottom, a back, and opposing sides with a stabilization system attached to its bottom and sides.

There has thus been outlined, rather broadly, the more important features of the invention in order that the detailed description thereof that follows may be better understood and in order that the present contribution to the art may be better appreciated.

The invention may also include the cabinet comprising a top shelf with one end of a plurality of legs attached to its opposing ends. The cabinet may further comprise a middle shelf with its opposing ends connected to the middle of the legs. There may be a front restraint attached to the front of the top shelf. There may be a plurality of retainer attachment holes in the middle of the legs. There may be a plurality of retainer hooks having opposing ends with one end removably inserted into the retainer attachment holes. There may be a retainer with its opposing ends connected to the opposing end of the retainer hooks. There may be a hole in the middle of the back to form a wire exit hole. The stabilization system may comprise a plurality of front stabilizers connected to the opposing end of the legs with legs slots in their top, a rear stabilizer attached to the opposing end of said legs, and a plurality of nuts threadedly attached to the opposing ends of the rear stabilizer. The front stabilizers and the rear stabilizer may be generally rectangular in shape. The cabinet, front stabilizers, and rear stabilizer may be made of plastic, steel, aluminum, titanium, wood, or carbon fiber composite. The opposing ends of the top shelf may be slidably mounted on the end of the legs. There may be a plurality of seat attachment holes in the end of the legs. There may be a door attached to the top of the cabinet. The door may be of the roll-up type. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electronics cabinet that has all of the advantages of the prior art television holding devices and none of the disadvantages.

It is another object of the present invention to provide a new and improved electronics cabinet that may be easily and efficiently manufactured and marketed.

An even further object of the present invention is to provide a new and improved electronics cabinet that has a low cost of manufacture with regard to both materials and labor, and which accordingly is then susceptible of low prices of sale to the consuming public, thereby making such electronics cabinet economically available to the buying public.

Still another object of the present invention is to provide a new electronics cabinet that provides in the apparatuses and methods of the prior art some of the advantages thereof, while simultaneously overcoming some of the disadvantages normally associated therewith.

Even still another object of the present invention is to provide an electronics cabinet for stabilizing electronic devices in vehicles. This allows the user to securely attach the electronics cabinet to the vehicle.

Still yet another object of the present invention is to provide an electronics cabinet for stabilizing electronic devices in vehicles. This makes it possible to secure items within the electronics cabinet.

An additional object of the present invention is to provide an electronics cabinet for stabilizing electronic devices in vehicles. This permits the electronics cabinet to hold a device on its top.

A further object of the present invention is to provide an electronics cabinet for stabilizing electronic devices in vehicles. This makes it possible to retract the door into the electronics cabinet when it opens.

A still further object of the present invention is to provide an electronics cabinet for stabilizing electronic devices in vehicles. This allows the user to choose which devices will be available during a trip.

Yet another additional object of the present invention is to provide an electronics cabinet for stabilizing electronic devices in vehicles. This permits the user to remove the devices and the electronics cabinet from the vehicle when they are not desired.

Lastly, it is an object of the present invention to provide a new and improved electronics cabinet for stabilizing electronic devices in vehicles.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
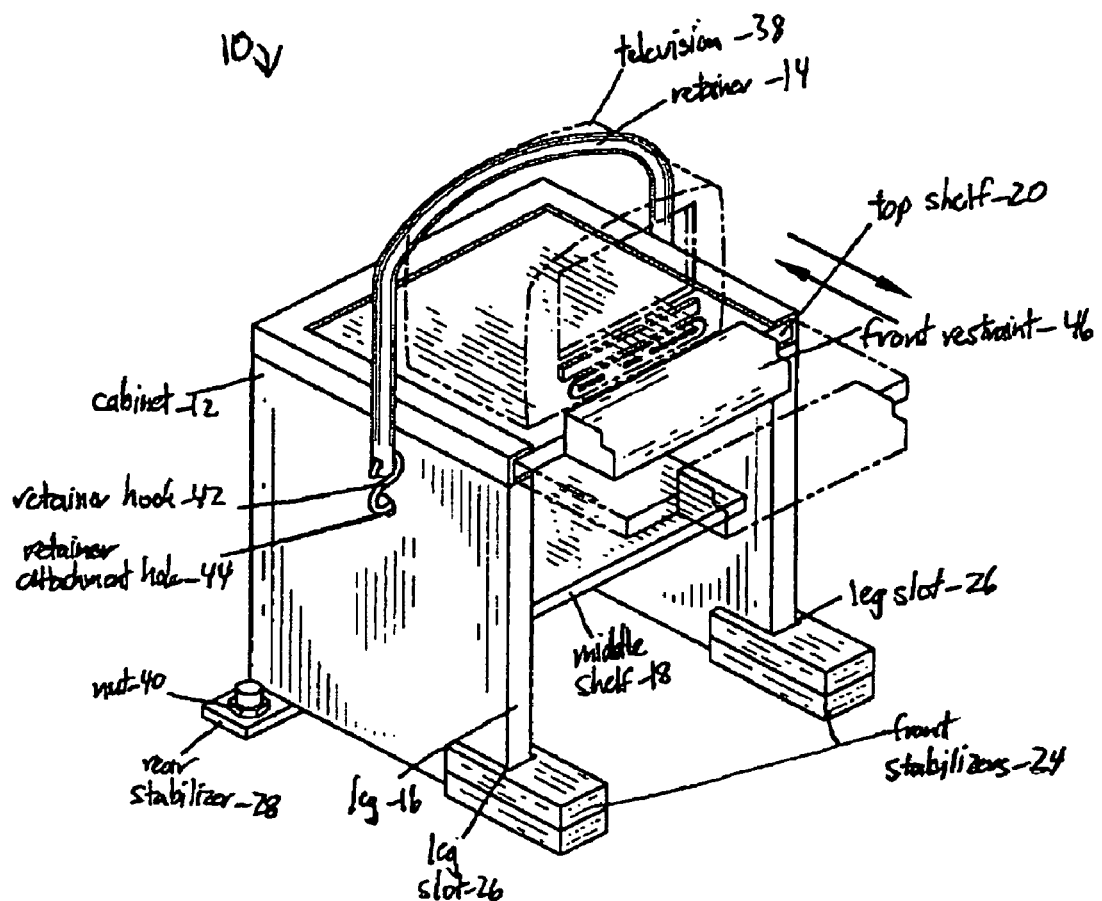
FIG. 1 is a top perspective view of the current embodiment of the electronics cabinet constructed in accordance with the principles of the present invention.
Figure 2:
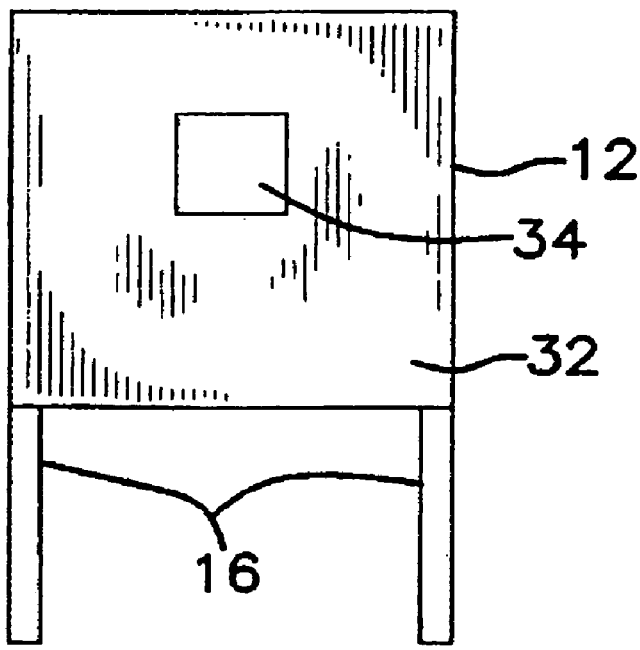
FIG. 2 is a rear side view of the electronics cabinet of the present invention.
Figure 3:
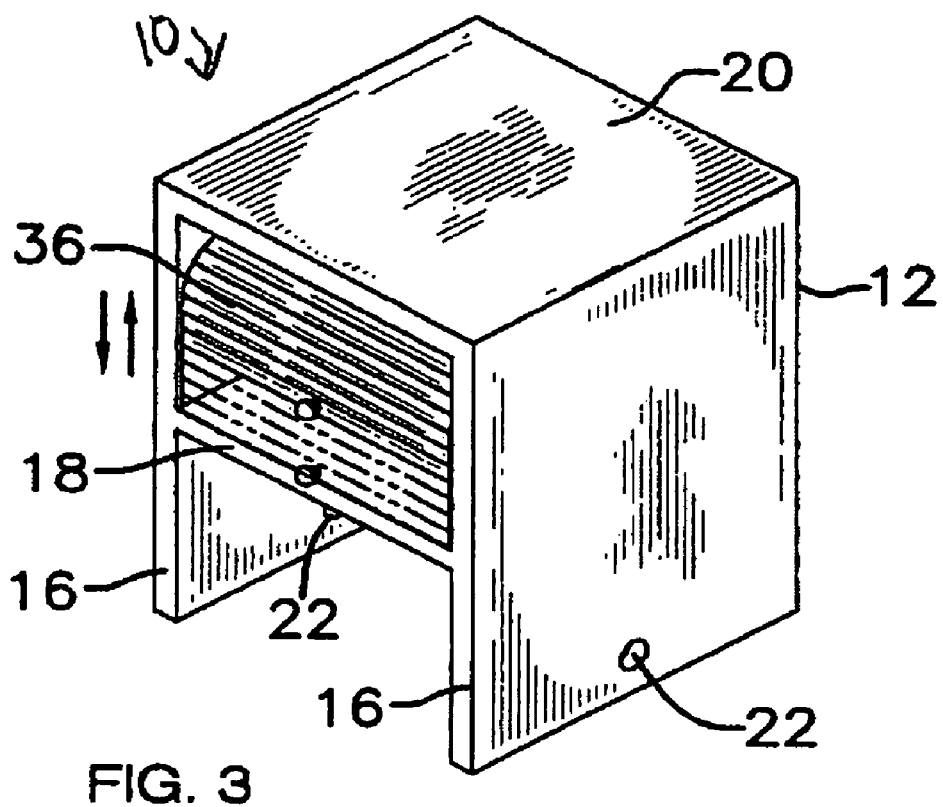
FIG. 3 is a top perspective view of an alternative embodiment of the electronics cabinet of the present invention.

Referring now to the drawings, and particularly to FIGS. 1–3, a current embodiment of the electronics cabinet of the present invention is shown and generally designated by the reference numeral 10.

In FIG. 1, a new and improved electronics cabinet 10 of the present invention for stabilizing electronic devices in vehicles is illustrated and will be described. More particularly, the electronics cabinet 10 has a cabinet 12 consisting of a top shelf 20 slidably attached to one end of legs 16. The slidably attached nature of top shelf 20 is denoted by the arrows and broken lines and allows the user to adjust the position of the television 38 without removing television 38 from the top shelf 20. A retainer 14 for securing electronic devices such as a television 38 has its opposing ends attached legs 16 by retainer hooks 42 removably inserted into retainer attachment holes 44. A front restraint 46 is attached to the front of the top shelf 20 to further secure the television 38 and to provide a convenient handhold to grasp when sliding the top shelf 20. A middle shelf 18 has its opposing ends connected to the middle of the legs 16. The bottom end of the front of legs 16 are inserted into leg slots 26. Leg slots 26 are cut into the top of front stabilizers 24. A rear stabilizer 28 supports the rear of the bottom end of legs 16. Nuts 40 (only one of which is visible) are threadedly attached to the opposing ends of the rear stabilizer 28, allowing the electronics cabinet 10 to be removably secured in place. In the current embodiment, the front stabilizers 24 and rear stabilizer 28 are generally rectangular in shape, retainer 14 is made of rubber, and cabinet 12, front stabilizers 24, and rear stabilizer 28 are made of plastic. Note that the broken lines illustrating the television 38 are for illustrative purposes only and are not part of the current invention.

Continuing with FIG. 2, a new and improved electronics cabinet 10 of the present invention for stabilizing electronic devices in vehicles is illustrated and will be described. More particularly, the electronics cabinet 10 has a cabinet 12 with a back 32 attached to one side of legs 16. A wire exit hole 34 cut in the middle of back 32 allows wires from any electronic devices enclosed by cabinet 12 to access a device placed on top of cabinet 12 and/or other parts of the vehicle (not shown) that cabinet 12 is mounted in.

Concluding with FIG. 3, an alternative embodiment of the new and improved electronics cabinet 10 of the present invention for stabilizing electronic devices in vehicles is illustrated and will be described. More particularly, the electronics cabinet 10 has a cabinet 12 with a roll-up door 36 in this embodiment. Roll-up door 36 retracts into the interior of cabinet 12 when it is in its open position. Seat attachment holes 22 are visible in the bottom end of legs 16, and are employed to removably attach the cabinet 12 to the seats (not shown) of a vehicle (not shown). Middle shelf 18 and top shelf 20 are shown supported by legs 16.

In use, it can now be understood that the electronics cabinet 10 is secured in place by inserting the front of the bottom end of legs 16 into the leg slots 26 of front stabilizers 24, resting the rear of the bottom end of legs 16 on rear stabilizer 28, and securing the rear stabilizer 28 in place using the nuts 40. Alternatively, electronics cabinet 10 is secured in place using the seat attachment holes 22. At this point, the user places the desired electronic devices such as a television 38 or other items on the top shelf 20 and/or the middle shelf 18. Depending on the embodiment used, retainer 14 and front restraint 46, or roll-up door 36, can be used to secure items to the cabinet 12. In the event electronic devices are placed inside cabinet 12, connecting wires can be passed through the wire exit hole 34 in back 32 so that they can be connected to devices on top of cabinet 12 and/or other parts of the vehicle, such as to a power supply. The user can adjust the position of the electronic devices on the top shelf 20 by sliding the top shelf 20 forward or backward, typically by grasping the front restraint 46. Upon arrival at the destination, the user can remove the electronic devices or other items placed on or in the electronics cabinet 10. The user can also remove the electronics cabinet 10 if desired by detaching the nuts 40 or seat attachment holes 22 from the vehicle.

While a current embodiment of the electronics cabinet has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as steel, aluminum, titanium, carbon fiber composite, or a variety of wood may be used instead of the plastic cabinet, front stabilizers, and rear stabilizer described. And although stabilizing electronic devices in vehicles has been described, it should be appreciated that the electronics cabinet herein described is also suitable for storing and supporting items in a wide range of environments. Furthermore, a wide variety of stabilization systems may be used instead of the seat attachment holes, front stabilizers, and rear stabilizer described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An electronics cabinet comprising: a cabinet having a top shelf, a back and a plurality of legs; and a stabilization system attached to a bottom of said legs of said cabinet, wherein said stabilization stem comprises: a plurality of front stabilizers having a top connected to front of bottom end of said plurality of legs, and said back having opposing ends attached to said legs; said front stabilizers having a plurality of leg slots in said top for inserting the front of the bottom end of said plurality of legs; a rear stabilizer having opposing ends attached to rear bottom end of said legs; and a plurality of nuts threadedly attached to said opposing ends of said rear stabilizer, and further comprising a front restraint attached to a front of said top shelf for adjusting a position of an electronic device and a door attached to said front opposing end of said legs, wherein said door is of the roll-up type.

2. The electronics cabinet as defined in claim 1, wherein said cabinet comprises: said plurality of legs having opposing ends and a middle; and said top shelf having opposing ends and a front with said opposing ends connected to top of said legs.

3. The electronics cabinet as defined in claim 2, wherein said cabinet further comprises a middle shelf having opposing ends with said opposing ends connected to said middle of said legs.

4. The electronics cabinet as defined in claim 1, further comprising:
   a plurality of retainer attachment holes wherein said middle of said legs defines a hole therein to comprise said retainer attachment holes;
   a plurality of retainer hooks having opposing ends with one end removably inserted into said retainer attachment holes; and
   a retainer having opposing ends with said opposing ends connected to said opposing end of said retainer hooks.

5. The electronics cabinet as defined in claim 1, further comprising a wire exit hole wherein said back of said cabinet defines a hole therein to comprise said wire exit hole.

6. The electronics cabinet as defined in claim 1, wherein said front stabilizers and said rear stabilizer are generally rectangular in shape.

7. The electronics cabinet as defined in claim 1, wherein said cabinet is selected from the group consisting of plastic, steel, aluminum, titanium, wood, and carbon fiber composite.

8. The electronics cabinet as defined in claim 1, wherein said front stabilizers are selected from the group consisting of plastic, steel, aluminum, titanium, wood, and carbon fiber composite.

9. The electronics cabinet as defined in claim 1, wherein said rear stabilizer is selected from the group consisting of plastic, steel, aluminum, titanium, wood, and carbon fiber composite.

10. The electronics cabinet as defined in claim 1, wherein said opposing ends of said top shelf is slidably mounted on said legs.

* * * * *